Dec. 13, 1960 N. E. ANDERSON 2,964,681
ARC CIRCUIT CONTROL
Filed Dec. 16, 1958

*INVENTOR.*
NELSON E. ANDERSON
BY H. Hume Mathews
Leslie C. Byer
ATTORNEYS

United States Patent Office 2,964,681
Patented Dec. 13, 1960

2,964,681

ARC CIRCUIT CONTROL

Nelson Edward Anderson, Berkeley Heights, N.J., assignor to Air Reduction Company, Incorporated, New York, N.Y., a corporation of New York Filed Dec. 16, 1958, Ser. No. 780,706

1 Claim. (Cl. 315—326)

My invention relates to control circuits for deenergizing the electrode holder or equivalent tool of an arc welding or arc cutting circuit during idle periods between welding or cutting operations. The use of such control circuits protects the welding operator and his associates not only from shock resulting from accidental bodily contact with the electrode in its holder or with exposed portions of the electrode holder but also from burns due to arc flashes caused by accidental short-circuits which also may do damage to whatever is brought into conductive engagement with the electrode in its holder or with exposed portions of the electrode holder. My invention will be described as applied to arc welding circuits.

The current values used in arc welding vary widely and are controlled by the nature of the welding operation being performed. The open circuit voltage of the welding circuit may also vary widely depending on the characteristics of the source of welding current supply. If a source of supply having a drooping volt-ampere characteristic is employed, the open circuit voltage may be from 55 to 75 volts even though the current values employed for the particular welding operation may be as low as 10 amperes or less. On the other hand current values of from 200 to 500 amperes or more may be used in gas-arc welding with a consumable electrode in order to obtain a spray transfer of metal from the electrode to the workpart and a self-regulating arc such as described and claimed in United States Letters Patent 2,504,868, Albert Muller, Glenn J. Gibson and myself for Electric Arc Welding granted April 18, 1950. The source of supply of this welding current may have a drooping characteristic in which case the open circuit voltage will be from 55 to 75 volts or it may have either a flat or substantially constant voltage over the current range or a rising characteristic corresponding to that of the welding arc characteristic in which latter cases the open circuit voltages may be from 25 to 35 volts.

If the electrode holder is de-energized by providing means for opening the welding circuit under load conditions as well as under no load conditions, it is necessary to use a circuit breaker or welding contacter which is of large size and considerable weight and which is furthermore expensive in cost. The size, weight and cost of such a contactor as part of the welding apparatus is frequently a disadvantage, especially when it is desirable to have a control which is readily portable by the operator to places of limited footing or into confined spaces for his direct operation and adjustment without the aid of an assistant. For example, the electrode holder may comprise a self-contained light weight and readily movable hand tool embodying a small reel of electrode material and motor means for feeding this electrode material through a nozzle structure by means of which welding current is supplied to the electrode and a shielding gas is supplied about its arcing terminals. Such a tool may, with its supply of electrode material, weigh no more than three or four pounds and is ideally suited for making short length welds in hard-to-get-at places. If the control for de-energizing such a tool could be of the order of two or three pounds in weight it too could be embodied in the tool without detracting from its maneuverability. If such a tool were used in practicing the invention of the above referred to Patent 2,504,868, the arc welding current values used would be of the order of 200 amperes and a welding contactor capable of interrupting this amount of current without injury to itself would weigh about 40 to 50 pounds and would have to be placed where it could be conveniently supported for remote control by the operator handling the welding tool. This would seriously detract from the portability of the tool and its control even if this control were enclosed in a cabinet separate from the tool and adapted for transportation by hand carrying or by being supported on the body of the operator.

It is an object of my invention to provide a deenergizing control for an electrode holder or an electrode feeding hand tool which is both small in size and light in weight so that it may be as readily portable as the holder or hand tool in which if desired it may be readily embodied without detracting from its maneuverability.

Other objects of my invention will become apparent from a consideration of the embodiments thereof illustrated in the accompanying drawing.

In the drawing—

In accordance with my invention I de-energize the electrode holder of the welding circuit by opening relay contacts which when closed connect the welding circuit to the electrode and the workpart and which can be opened only after the welding operator has broken the welding arc to interrupt the flow of welding current in this circuit once the circuit has been completed at the welding electrode and the workpart. The contacts of the relay thus employed for disconnecting the electrode holder from the source of welding current are consequently not subjected to the duty of interrupting the flow of welding current and need only have adequate capacity for carrying the welding current when in circuit closing position. This makes it possible to use a small size, light weight relay such as employed in automobile engine starting circuits in place of a large and heavy circuit breaker which is capable of interrupting high welding current values at from 25 to 75 volts without doing injury to itself. My invention will be more fully understood from a consideration of the embodiments thereof shown in the accompanying drawing.

Figure 1:
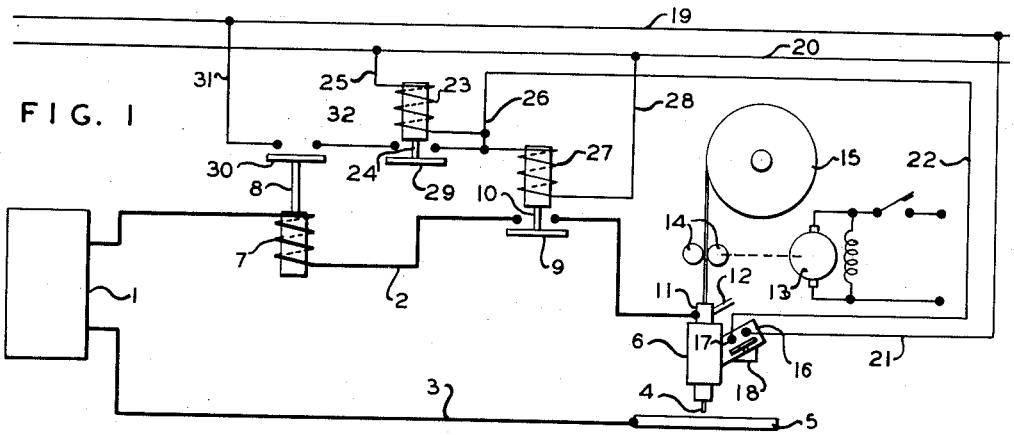
Fig. 1 is a diagrammatical representation of the control elements which I employ for deenergizing the electrode holder by disconnecting it from the welding source of supply after the flow of current in the welding circuit has been interrupted at the welding arc.

In the system shown in Fig. 1 of the drawing, welding current is supplied from a source of welding current 1 through a welding circuit 2, 3 to an arc established between an electrode 4 and a cooperating electrode provided by a workpart 5. One terminal of the welding current source of supply is connected by circuit 2 to the contact means of the electrode holder or hand tool 6 through the operating winding 7 of a current relay 8 and the contacts 9 of a disconnect relay 10. The other terminal of the welding current source of supply is connected directly to the workpart 5 by circuit 3.

The contact mechanism for supplying welding current to the electrode 4 forms part of a nozzle structure 11 to which shielding gas is supplied through a conduit 12 and discharged about the arcing terminal of the electrode and the portions of the workpart rendered molten by the arc. The electrode is fed through nozzle structure 11 by an electric feed motor 13 which drives feed rolls 14 which engage the electrode and withdraws it from a supply reel 15 on which it is coiled. The electrode holder contact means and the means for feeding an electrode therethrough may form parts of the hand tool 6 or the hand tool may be suitably connected with the other parts above mentioned as disclosed in the above referred to Patent 2,504,868, Muller et al. It is to be understood that the nozzle structure 11 may have any suitable construction by means of which welding current is supplied to the electrode in its passage therethrough and a shielding gas is supplied about its arcing terminal.

The electrode holder or hand tool 6 is provided with a handle 16 having a control switch 17 therein which is normally biased to its open position but which can be closed by operation of a trigger member 18 extending from the handle of the electrode holder. A source of control voltage is connected to conductors 19 and 20 and the closure of control switch 17 completes a circuit from conductor 19 through conductors 21 and 22, the control winding 23 of auxiliary relay 24 and a conductor 25 to the other conductor 20 as well as a circuit from conductor 19 through conductors 21, 22 and 26, the operating winding 27 of disconnect relay 10 and conductor 28 to conductor 20. The auxiliary relay 24 and the disconnect relay 10 will thus be energized to close their respective contacts 29 and 9 upon the closure of control switch 17.

The closure of contacts 9 of the disconnect relay connects the source of welding current supply 1 to the electrode 4 and workpart 5 through welding circuit 2, 3 so that current can flow in this welding circuit as soon as the electrode 4 is brought into engagement with the workpart or an arc is established between the electrode and the workpart. This flow of welding current through the operating winding 7 of current relay 8 will cause it to close its contacts 30 which in conjunction with the closure of contacts 29 of the auxiliary relay 24 completes a holding circuit for the respective operating winding 23 and 27 of auxiliary relay 24 and disconnect relay 10. This holding circuit extends from conductor 19 in shunt to the contacts of control switch 17 through conductor 31, contacts 30 of current relay 8, conductor 32, contacts 29 of auxiliary relay 24, conductor 26 and thence through the parallel branches of this holding circuit including the operating winding 23 of auxiliary relay 24 and the conductor 25 and the operating winding 27 of disconnect relay 10 and conductor 28, to conductor 20. Consequently as long as current continues to flow in the welding circuit, contacts 9 of disconnect relay 10 are held in their closed position independently of the maintained closure of the control switch 17, and once the welding circuit has been completed at the electrode and the workpart and the flow of welding current has been established the opening of control switch 17 by the operator will not deenergize the operating winding 27 of the disconnect relay 10.

When, however, the operator interrupts the welding operation by breaking the welding arc between electrode 4 and workpart 5, current relay 8 is immediately deenergized and by opening its contacts 30 immediately de-energizes both the operating winding 23 of the auxiliary relay 24 and the operating winding 27 of the disconnect relay 10. The disconnect relay 10 consequently opens its contacts 9 under no load conditions and its contacts are consequently not subjected to the duty of interrupting the flow of welding current in the welding circuit. This disconnect relay need not have contacts capable of withstanding the severe arcing resulting from interrupting the flow of welding current values of substantial magnitude and need not have mechanism for separating these contacts by an amount to open inductive circuits having operating voltages of from 25 to 75 volts and can consequently be small in size and light in weight since its contacts or the circuit including these contacts need have only adequate capacity for carrying the welding current when these contacts are closed. The total weight of the three relays employed in the control just described can consequently be of the order of 2 or 3 pounds as compared to the 40 or 50 pounds circuit breaker that would otherwise have to be employed for opening the welding circuit under load conditions.

Figure 3:
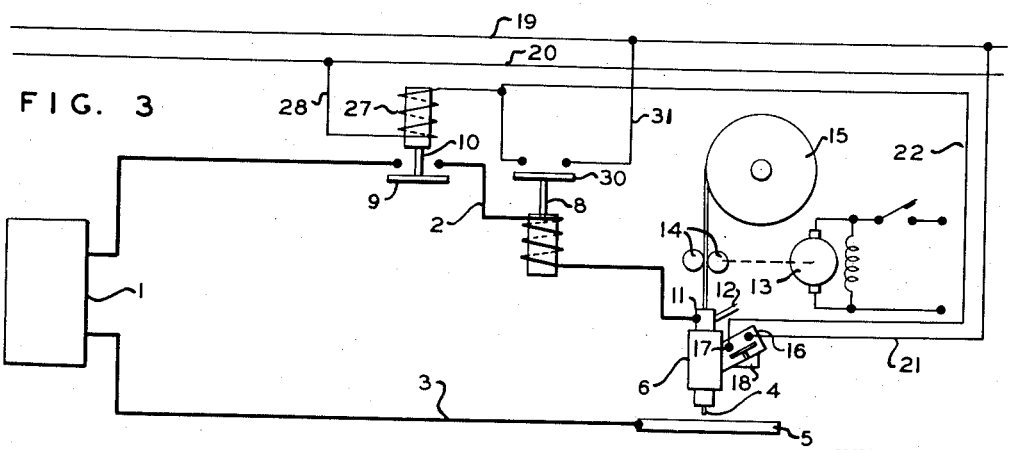
Fig. 3 is a simplification of the control shown in Fig. 1.

The circuit arrangement shown in Fig. 3 of the drawing is a simplification of the circuit arrangement shown in Fig. 1 in that the auxiliary relay 24 has been omitted and operation of the control switch 17 directly controls the energization of the operating winding 27 of the disconnect relay 10. In Fig. 3 as in Fig. 1, the current relay 8, by closing its contacts 30 in response to current flow, completes a circuit in shunt to the contacts of control switch 17 for maintaining the energization of the operating winding 27 of the disconnect relay 10 independently of the maintained closure of control switch 17.

Figure 2:
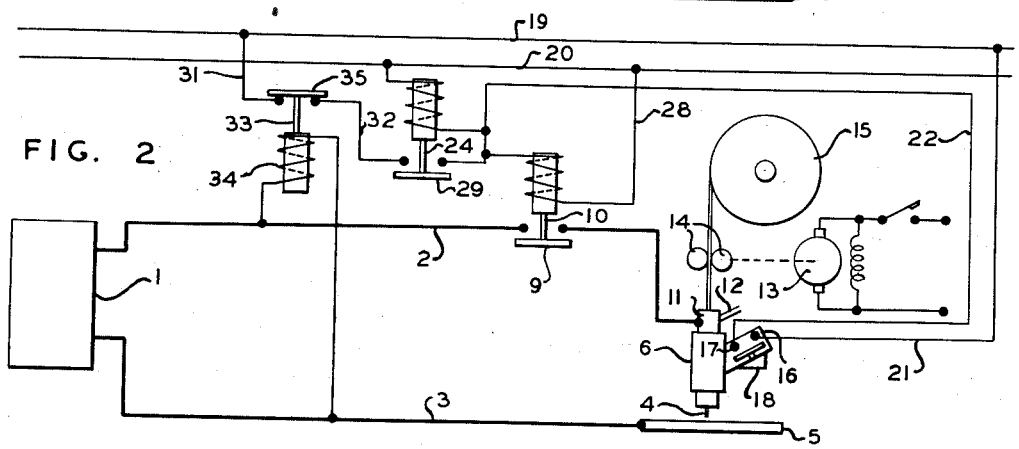
Fig. 2 is a modification of the control shown in Fig. 1.

The current relay 8 of the control circuits shown in Figs. 1 and 3 constitute a means responsive to an electrical characteristic of the welding circuit which, after the closure of the contact means of the disconnect relay 10, is indicative of the completion of the welding circuit at the electrode and the workpart and which operates to maintain the energization of the disconnect relay winding and the closure of the contact means of this relay so long as current is flowing in the welding circuit. It is obvious that other means having a like function and responsive to welding circuit conditions may be substituted for this master relay of these control circuits. Thus as shown in Fig. 2, if the source of welding current supply has a drooping volt-ampere characteristic, a voltage relay 33 having its operating winding 34 connected across the welding circuit conductors 2, 3 may be used as a substitute for the current relay 8 of the previously described circuits. This voltage relay 33 would have normally closed contacts 35 connected in circuit with the normally open contacts 29 of the auxiliary relay 24 of these previously described circuits. The open circuit voltage of the welding circuit would be sufficient to energize the operating winding 34 of the voltage relay 33 enough to cause it to open its normally closed contacts 35 but the reduced voltage of the welding circuit 2, 3 during the flow of welding current therein would not provide sufficient energization to cause the operating winding 34 of this relay to maintain its contacts 35 open, and their closure during the flow of welding current in the welding circuit would complete the holding circuit for auxiliary relay 24 and disconnect relay 10 to complete control circuits such as have been described above with respect to the arrangement shown in Fig. 1. When current flow in the welding circuit is interrupted due to the operator breaking the welding arc between the electrode 4 and the workpart 5, the voltage of the welding circuit will rise sufficiently to energize winding 34 of relay 33 to cause it to open its contacts 35 immediately and thus de-energize auxiliary relay 24 and disconnect relay 10 and cause the latter to open its contacts 9 to de-energize the electrode holder 6.

In the arrangement shown in Fig. 2 the combined space requirements and weights of the three relays employed would be of the same magnitude as those above considered in connection with Fig. 1 and their substitution for a welding contactor capable of opening a welding circuit under load conditions would have the same advantages.

As previously stated the disconnect relay may be of the type commonly employed in automobile starting circuits. Its contacts or the contact means thereof would be adequate for carrying the welding current when in a closed position but would not have adequate capacity for interrupting the flow of current in the welding circuit since the contacts and their separation are capable only of interrupting the flow of high current values at voltages of the order of 6 to 12 volts and not at the 25 to 75 volts which would be imposed thereon if used in a welding circuit to open it under load conditions. It is of course apparent that any suitable circuit controlling means actuated by the controlled energization of its operating winding may be substituted for a disconnect relay of the type just described which by reason of the fact that it is not subjected to the duty of interrupting high current values in inductive circuits will be light in weight and small in size. Furthermore, the employment of such a disconnect relay in accordance with my invention has a decided economic advantage in that its cost is very much less than the cost of a welding contactor which is constructed and arranged to interrupt the welding circuit under load conditions. In accordance with my invention the control means for energizing and de-energizing the welding circuit by respectively closing and opening contacts in the circuit by a mechanism which is actuated by the energization and de-energzation of an operating winding forming part of this control means may be variously modified so long as the control means is functionally operable for carrying the welding current in the welding circuit without having the added capability of being functionally operable for interrupting the flow of current in the welding circuit.

As indicated above my invention is not limited to control apparatus for de-energizing the electrode holder of an arc welding circuit but may be applied advantageously for accomplishing like results in re-energizing the electrode holder of an arc cutting circuit. Other like uses of my invention are contemplated.

In view of the modifications of my invention described above, other modifications thereof will occur to those skilled in the art and I intend in the appended claim to cover all such modifications and variations of my invention.

I claim:

Arc welding apparatus comprising a circuit for supplying welding current to an arc connected in series therewith, a small, light weight disconnect relay having in said circuit normally open contacts which when closed will safely carry the arc welding current flow in said circuit but which will not withstand the service imposed thereon when operated to an open position to interrupt the flow of said current in said circuit and said disconnect relay also having an operating winding the energization of which causes it to close its said contacts to complete said circuit, means for operating said disconnect relay to close its said contacts, said means including a control switch having contacts the closure of which completes an energizing circuit for said operating winding of said disconnect relay, and means for operating said disconnect relay to open its said contacts immediately after current flow in said circuit is interrupted, said means being responsive to current flow in said circuit and operating so long as current is flowing in said circuit to complete a circuit in shunt to the contacts of said control switch to maintain the energization of said operating winding of said disconnect relay which, prior to the flow of current in said circuit, has its said operating winding energized by the closure of the contacts of said control switch.

References Cited in the file of this patent

UNITED STATES PATENTS

| | | |
|---|---|---|
| 1,320,123 | Candy | Oct. 28, 1919 |
| 1,708,072 | Alexander | Apr. 9, 1929 |
| 2,023,051 | Jones | Dec. 3, 1935 |
| 2,078,690 | Schueler | Apr. 27, 1937 |
| 2,449,456 | Croco et al. | Sept. 14, 1948 |
| 2,769,118 | Lester | Oct. 30, 1956 |

FOREIGN PATENTS

| | | |
|---|---|---|
| 811,720 | France | Jan. 23, 1937 |